United States Patent
Tyler et al.

(10) Patent No.: US 12,458,018 B1
(45) Date of Patent: Nov. 4, 2025

(54) SOLID PHASE COMPOSITIONS AND MANUFACTURING METHODS FOR ECTOPARASITICIDAL CONTROL

(71) Applicant: The Hartz Mountain Corp., Secaucus, NJ (US)

(72) Inventors: Michael Tyler, Secaucus, NJ (US); Joseph Conti, Secaucus, NJ (US); Kenneth Predpazlo, Secaucus, NJ (US); Kimball Woelfel, Secaucus, NJ (US); Takeshi Ikegami, Secaucus, NJ (US)

(73) Assignee: THE HARTZ MOUNTAIN CORP., Secaucus, NJ (US)

(*) Notice: Subject to any disclaimer, the term of this patent is extended or adjusted under 35 U.S.C. 154(b) by 0 days.

(21) Appl. No.: 19/000,004

(22) Filed: Dec. 23, 2024

(51) Int. Cl.
*A01N 25/10* (2006.01)
*A01N 43/56* (2006.01)
*A01P 7/04* (2006.01)

(52) U.S. Cl.
CPC ............ *A01N 25/10* (2013.01); *A01N 43/56* (2013.01); *A01P 7/04* (2021.08)

(58) Field of Classification Search
CPC ............ A01N 25/10; A01N 43/56; A01P 7/04
See application file for complete search history.

(56) References Cited

U.S. PATENT DOCUMENTS

| | | | |
|---|---|---|---|
| 3,046,237 A | 7/1962 | Rosenfelder et al. | |
| 5,437,869 A * | 8/1995 | Kelley | A01N 25/18 424/409 |
| 6,096,329 A | 8/2000 | Jeannin | |
| 6,395,765 B1 | 5/2002 | Etchegaray | |
| 7,531,186 B2 | 5/2009 | Boeckh | |
| 7,910,122 B2 | 3/2011 | Sirinyan | |
| 8,022,067 B2 | 9/2011 | Annan | |
| 8,071,116 B2 | 12/2011 | Sirinyan | |
| 8,367,088 B2 | 2/2013 | Kelley | |
| 8,475,818 B2 | 7/2013 | Guerino | |
| 8,614,244 B2 | 12/2013 | Nouvel | |
| 8,846,722 B2 | 9/2014 | Ecker | |
| 8,901,154 B2 | 12/2014 | Cottrell | |
| 8,927,583 B2 | 1/2015 | Hungenberg | |
| 9,149,416 B1 | 10/2015 | Xie | |
| 9,392,792 B1 | 7/2016 | Delhom | |
| 9,433,615 B2 | 9/2016 | Ecker | |
| 9,451,764 B2 | 9/2016 | Gutsmann | |
| 9,451,772 B2 | 9/2016 | Saxell | |
| 9,561,485 B2 | 2/2017 | Yan | |
| 9,913,473 B2 | 3/2018 | Saxell | |
| 9,925,167 B2 | 3/2018 | Kalbe | |
| 9,949,487 B1 | 4/2018 | Hemsarth | |
| 10,531,660 B2 | 1/2020 | Boecker | |
| 10,785,973 B2 | 9/2020 | Taranta | |
| 10,864,193 B2 | 12/2020 | Pate | |
| 2008/0194641 A1 | 8/2008 | Anspaugh | |
| 2009/0305886 A1 | 12/2009 | Langewald | |
| 2011/0183012 A1 | 7/2011 | Gewehr | |
| 2017/0333397 A1 | 11/2017 | Pate et al. | |

FOREIGN PATENT DOCUMENTS

| | | |
|---|---|---|
| AU | 2014271256 | 1/2015 |
| CN | 2012105820 | 1/2015 |
| WO | 2020240394 A1 | 12/2020 |

OTHER PUBLICATIONS

Rust MK., Insecticide Resistance in Fleas, Insects. Mar. 2016;7(1):10. https://www.ncbi.nlm.nih.gov/pmc/articles/PMC4808790/.

Evaluation of indoxacarb and fipronil (s)-methoprene topical spot-on formulations to control flea populations in naturally infested dogs and cats in private residences in Tampa FL. USA Dryden MW, Payne PA, Smith V, Chwala M, Jones E, Davenport J, Fadl G, de Zeiders MF, Heaney K, Ford P, Sun F Parasites & vectors. Dec. 1, 2013;6(1):366. https://www.ncbi.nlm.nih.gov/pmc/articles/PMC3892057/.

Efficacy of a novel topical combination of fipronil, (S)-methoprene, eprinomectin, and praziquantel, against the ticks, Ixodes ricinus and Ixodes scapularis, on cats E. Tielemans et al., Veterinary parasitology. Apr. 28, 2014;202(1-2):59-63. URL https://pubmed.ncbi.nlm.nih.gov/24703079/.

A. Ali et al., Laboratory evaluation of selected larvicides and insect growth regulators against field-collected Culex quinquefasciatus larvae from urban Dhaka, Bangladesh, Journal of the American Mosquito Control Association. Mar. 1999;15(1):43-7.; https://pubmed.ncbi.nlm.nih.gov/10342267/.

* cited by examiner

*Primary Examiner* — Ali Soroush
*Assistant Examiner* — Andriae M Holt
(74) *Attorney, Agent, or Firm* — Gottlieb, Rackman & Reisman, PC

(57) ABSTRACT

The invention relates to a solid molded body for external use against parasites on companion animals. The molded body of the invention includes a phenyl pyrazole insecticide such as fipronil as the active compound with the addition of the plasticizers triphenyl phosphate and dicapryl adipate. In addition, the insect growth regulators pyriproxyfen and methoprene may be added as additional actives.

28 Claims, 2 Drawing Sheets

SOLID PHASE COMPOSITIONS AND MANUFACTURING METHODS FOR ECTOPARASITICIDAL CONTROL

TECHNICAL FIELD

The present invention relates broadly to compositions and methods for treating animals infested with ectoparasites, and in particular, to compositions useful for treating companion animals such as dogs or cats and livestock such as sheep, cows, goats, horses, etc. More specifically, the invention relates to improved ectoparasiticidal compositions for preventing, controlling and repelling fleas, ticks and mosquitoes infested in household pets such as dogs or cats, to methods of using the same, and to methods for preparing the same.

In particular, the present invention relates to active compound-containing molded bodies for external use against ectoparasites on animals.

BACKGROUND OF THE INVENTION

The infestation of companion animals, and in particular household pets such as dogs, with ectoparasites such as fleas, ticks, mosquitoes, flies, lice and the like, which live by hematophagy (i.e., by sucking the animal's blood), is highly undesirable. Active compound-containing molded bodies and other means for controlling ectoparasites in animals have been known for a long time. For example, U.S. Pat. No. 7,910,122 describes active compound-containing molded bodies for external use against parasites on animals. Indeed, the prior art has developed numerous formulations and compositions for treating such infestations, many of which are incorporated into animal collars and/or ear tags [or are "spot on" or "pour on" formulations that are applied by deposition directly on the animal's skin and/or fur. Such formulations often contain an N-phenyl pyrazole, and in particular, 1-[2,6-Cl$_2$-4-CF$_3$-phenyl]-3-CN-4-[SO—CF$_3$]-5- NH$_2$-pyrazole, whose common name is fipronil, as the active ingredient. Fipronil is an insecticide that is particularly effective to control and/or eliminate adult fleas and ticks, and when selected, is generally safe for use on companion animals such as dogs and cats.

U.S. Pat. No. 6,395,765 to Etchegaray, which is incorporated herein by reference in its entirety, discloses and claims particular ectoparasiticidal compositions comprising (a) an N-phenyl pyrazole, such as fipronil, as the active ingredient, along with inert, inactive ingredients.

There are also many formulations in the marketplace that contain an insect growth regulator (IGR) component. IGRs kill flea larvae and prevent flea eggs from hatching. Such formulations provide for an effective flea control system since only about 5% of the existing fleas on an animal are adults and the other 95% are in a juvenile state (eggs and larvae). For example, methoprene, hydroprene and pyriproxyfen (commercially available as Nylar) are IGRs that prevent flea eggs from hatching, and all are considered generally as safe to use on companion animals.

U.S. Pat. No. 9,433,615, incorporated herein by reference, describes one or more formulations which co-administer a non-mobile insect growth regulator such as pyriproxyfen, a mobile insect growth regulator such as methoprene or hydroprene, and an adulticide to the companion animal. More particularly, the '615 patent teaches that the application of two IGRs-preferably an IGR with high mobility property such as methoprene or hydroprene due to its volatility (mobile IGR) and a non-mobile IGR such as pyriproxyfen-on the same animal, especially a non-human animal, so as to be present at the same time, achieves surprising synergistic effect and offers a broader and more effective means of infestation control than using the same total quantity of either IGR separately.

It is therefore a principal object of the present invention to provide an ectoparasiticidal formulation for the treatment and protection of companion animals such as dogs having enhanced efficacy and which can be incorporated into a molded body.

It is another object of the present invention to provide ectoparasiticidal compositions and products that are easy to use and easy to be incorporated into a molded body.

It is yet a further object of the present invention to provide an ectoparasiticidal formulation, as well as a molded body product for incorporating the formulation, having a higher rate of kill of parasites than can be achieved using presently available technology.

Still other objects of the invention will become apparent from the following description.

SUMMARY OF THE INVENTION

These and other objects of the present invention are achieved by providing an improved ectoparasiticidal formulation suitable for a molded body that is used in the treatment of companion animals such as dogs or cats that are or could become infested with parasites. The invention also relates to a solid molded body for external use against parasites on animals. The molded body of the invention includes a phenyl pyrazole insecticide such as the N-phenyl pyrazole fipronil as the active in combination with phosphoric acid esters and adipic acid esters as plasticizers, preferably the plasticizers triphenyl phosphate and dicapryl adipate. Instead of fipronil as the active, the phenyl pyrazole insecticide may instead be chosen from acetoprole, ethiprole, flufiprole, pyraclofos, pyrafluprole, pyriprole, pyrolan and vaniliprole. In addition, the insect growth regulators pyriproxyfen and methoprene may be added as additional actives. Further, the improved formulation may also include a pyrethroid, preferably bifenthrin, as an added pesticidally active ingredient.

The methods of the invention comprise methods of parasite control for companion animals such as dogs by administering the improved ectoparasiticidal compositions along the skin of the animal, preferably by inclusion of the inventive formulation into a molded body such as an animal collar or tag. Thus, one aspect of the present invention generally concerns improved formulations for treating companion animals such as dogs suffering from one or more ectoparasitical infestations or to act as a prophylactic treatment to avoid possible infestation.

Another feature of the invention provides for a formulation comprising the active fipronil or another phenyl pyrazole insecticide combined with triphenyl phosphate with or without dicapryl adipate.

A further aspect of the invention generally concerns improved methods for treating companion animals suffering from one or more ectoparasitical infestations. In one embodiment of this aspect of the invention, methods for administering an ectoparasiticidal formulation to an infested animal are provided. A second aspect is the prophylactic use for avoidance of infestation.

In another aspect of the invention, a method for manufacturing a molded body which incorporates an ectoparasiticidal formulation is provided.

DETAILED DESCRIPTION OF THE INVENTION

Figure 1:
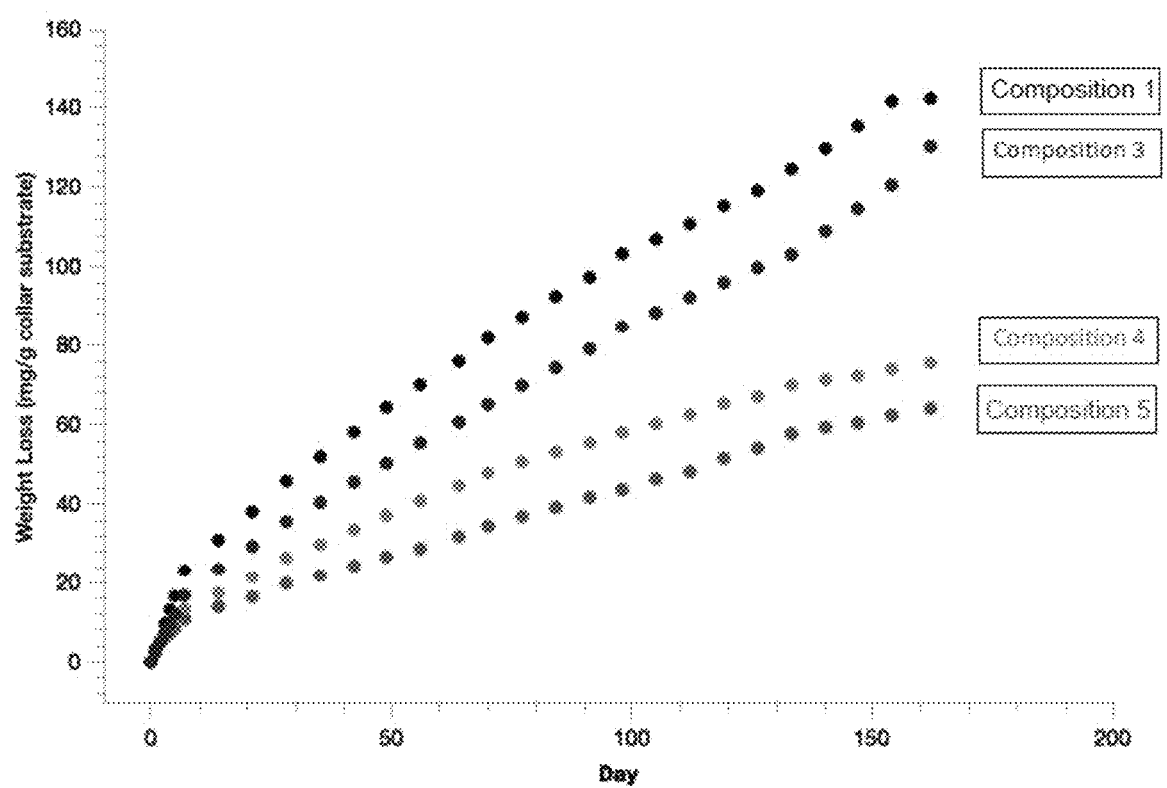
FIG. 1 is a first graph showing collar test strip weight loss resulting from the level of the plasticizers triphenyl phosphate and dicapryl adipate.

The preferred and other embodiments of each aspect of the present invention will now be further described herein.

The present invention, in one aspect, resides in the discovery that the plasticizer triphenyl phosphate in combination with a phenyl pyrazole insecticide ingredient such as fipronil as the active facilitates slowing down the release of the phenyl pyrazole component in a molded body such as an animal collar or tag. Stated differently, the combination of a phenyl pyrazole such as fipronil and the plasticizer triphenyl phosphate ("TPP") provides for enhanced efficiency, controlling the release of the phenyl pyrazole component so that the life expectancy and efficacy of the molded body is prolonged by effectively treating and controlling ectoparasites that infest companion and other animals for a longer period of time.

The present invention, in another aspect, resides in the discovery that the combination of the plasticizers triphenyl phosphate ("TPP") and dicapryl adipate ("DCA"), when used together in an ectoparasiticidal composition in combination with a phenyl pyrazole such as fipronil as the active ingredient, facilitates slowing down the release of the phenyl pyrazole in a molded body such as an animal collar or tag. In other words, the combination of a phenyl pyrazole such as fipronil and the plasticizers triphenyl phosphate and dicapryl adipate provides for even greater enhanced efficiency, controlling the release of the phenyl pyrazole component so that the life expectancy and efficacy of the molded body is prolonged by effectively treating and controlling ectoparasites that infest companion animals such as dogs.

Without being bound by any particular explanation, it is believed that this enhanced activity is due to enhanced transport of the active pesticide from the interior to the exterior of the molded body, In accordance with one embodiment of the invention, the solid molded body of the invention comprises a composition which includes fipronil as the pesticidally-active ingredient along with the plasticizers triphenyl phosphate and dicapryl adipate.

Also in accordance with the invention, other adipic acid esters, such as Bis(2-ethylhexyl) adipate, could be substituted for dicapryl adipate without departing from the invention.

In general, the composition contains an amount of a phenyl pyrazole such as fipronil that is between about 1.0 and 25.0 percent by weight of the overall composition, preferably between about 2.0 and 15.0 weight percent. The plasticizers triphenyl phosphate and dicapryl adipate, if both are included, are employed in quantities of from about 5 to 50% by weight, preferably from about 15 to 45% by weight of the total composition.

Triphenyl phosphate is present in the inventive composition in an amount between about 5.00 and 50.00 weight percent, preferably in an amount between about 20.00 and 35.00 weight percent. Dicapryl adipate, or another adipic acid ester, if included, is present in the inventive composition in an amount between about 10.00 and 30.00 weight percent, preferably in an amount between about 12.00 and 25.00 weight percent.

Importantly, the weight ratio of triphenyl phosphate to the phenyl pyrazole component in the inventive composition is between about 4.0:1 and 0.75:1, preferably between about 2.5:1 and 1.0:1, more preferably between about 2.0:1 and 1.25:1.

Significantly, the weight ratio of triphenyl phosphate to dicapryl adipate (presuming the latter is included) in the inventive composition is between about 2.25:1 and 0.25:1, preferably between about 1.75:1 and 0.45:1, more preferably between about 1.5:1 and 1.0:1.

In the treatment of ectoparasites that infest animals, the composition of the inventive molded body may also include a pyrethroid such as bifenthrin in an amount between about 1.0 and 25.0 percent by weight of the overall composition, preferably between about 2.0 and 15.0 weight percent. Although bifenthrin is the preferred pyrethroid that may be incorporated in to the inventive composition, other pyrethroids could perhaps be used, such as permethrin, deltamethrin, zeta-cypermethrin, lambda cyhalothrin and beta cyfluthin. Such other pyrethroids, if added, would be used in amount in the composition between about 1.0 and 25.0 weight percent, preferably between about 2.0 and 15.0 weight percent.

In accordance with another, preferred, embodiment of the invention, the composition of the invention will also include one or both of the insect growth regulators pyriproxyfen and methoprene. The insect growth regulators, if added, may be present in the overall composition in an amount that is between about 0.1 and 2.0 weight percent for each of methoprene and pyriproxyfen, preferably between about 0.2 and 0.9 weight percent for each.

More preferably, the composition of the molded body comprises an amount of the phenyl pyrazole insecticide such as fipronil that is between about 5.0 and 15.0 percent by weight of the overall composition. The plasticizers triphenyl phosphate and dicapryl adipate, if both are added, are present in the composition in an amount between about 35 and 45 percent by weight.

It should be noted that a formula for the inventive composition containing fipronil between 5 and 15 weight percent, with the plasticizers triphenyl phosphate and dicapryl adipate together in the composition an amount between 25 and 45 weight percent and in combination with one or both of the insect growth regulators pyriproxyfen and methoprene is a highly efficacious combination.

The solid molded body according to the invention may be, for example, a neck collar, pendant for a neck collar (medallions), an ear tag, a collar for attachment to limbs or body parts, an adhesive strip and film or stripping films. Particular preference is given to a neck collar.

Thermoplastic and flexible polyolefins and elastomers may be suitable for use as a carrier substance or base for the molded body composition of the invention. These include polyvinyl resins, EPDM (ethylene-/propylene-diene terpolymer), polyethylene (e.g. HDPE or LLDPE) and polypropylene.

These polymers must exhibit sufficient strength and pliability to ensure that they do not rupture or become brittle during molding. They also must be of sufficient durability so as to be resistant to normal wear and tear. In addition, the polymers must allow for sufficient migration of the active compound to the surface of the molded body for the life of the product.

It is preferred to use a thermoplastic elastomer as the carrier substance for the inventive composition, and, more particularly, a polyvinyl resin as the carrier material. The polyvinyl resins that may be used in preparing the inventive molded body include polyvinyl halides, such as polyvinyl chloride, polyvinyl chloride-vinyl acetate and polyvinyl fluoride; polyvinylbenzenes, such as polystyrene and polyvinyltoluene. According to one embodiment of the invention, polyvinyl chloride is the preferred polyvinyl resin carrier.

The polyvinyl resin should be incorporated into the composition in an amount between about 30 and 60 weight percent.

Other suitable carriers are polyolefins such as polypropylene, polyethylene and EPDM. They can be included in the composition in an amount between about 30 and 60 weight percent.

Examples of suitable additional plasticizers to be added to the inventive composition are the esters of azelaic acid, maleic acid, ricinoleic acid, myristic acid, palmitic acid, oleic acid, sebacic acid, stearic acid and trimellitic acid, as well as complex linear polyesters, polymeric plasticizers and epoxidized soybean oils.

It is also possible for the molded body of the invention to contain other customary constituents such as stabilizers, lubricants, mold-release agents, fillers and coloring materials.

Suitable stabilizers are antioxidants and agents which protect the collars from ultraviolet radiation and undesired breakdown during processing. Examples of lubricants which can be used are stearates, stearic acid and low molecular weight polyethylenes These constituents may be used at a concentration of up to about 5% by weight of the total composition. When a molded body of the invention is produced, the different constituents are mixed in accordance with known methods and molded in accordance with known extrusion and injection molding methods.

Choosing the processing method for producing the inventive molded body depends in large part on the properties of the polymeric carrier material and on the shape of the desired molded body. The molded body according to the invention can be produced by casting, dipping, pressing, injection-molding, extruding, calendering, stamping, bending, thermoforming, etc. These processing methods are known to those of skill in the art.

The solid molded body according to the invention is suitable for controlling parasites which are often found in companion animals such as dogs and cats. They are effective against normally sensitive and resistant ectoparasites as well as against all or some of the development stages of the said ectoparasites.

According to the invention, the inventive molded body is very effective for controlling ectoparasites, particularly those which affect companion animals. The molded body according to the invention is designed for performing external or dermal treatments on animals, in particular dogs and cats. The molded body usually has a thickness of 0.25-4.5 mm, preferably 0.75-3.5 mm.

Composition 1 is an example of the inventive composition:

| Material | Composition 1 |
|---|---|
| PVC Resin | 41.13 |
| Dicapryl Adipate | 16.57 |
| Triphenyl Phosphate | 28.00 |
| Fipronil | 12.00 |
| Methoprene | 0.50 |
| Pyriproxyfen | 0.50 |
| Plastistab 2417 | 2.00 |
| Titanium Dioxide | 0.30 |

Preparation
1. Run a high intensity mixer, such as those made by Henchel, at low speed. Add the PVC resin.
2. Increase mixer to high speed. Heat to 150° F.
3. Combine the liquid ingredients together in a suitable container: Add this mixture to the high intensity mixer containing the warm PVC resin.
4. Continue mixing at high speed. When the temperature reaches 180° F., reduce the mixing to low speed and slowly add triphenyl phosphate to the blend.
5. When the temperature reaches 180° F., discharge the blend into a cooler mixer.
6. Add pesticide(s) and the pigment(s) to the cooler mixer.
7. Mix for 5 minutes or until temperature reaches approximately 100° F.
8. Discharge the completed blend into an appropriate vessel and store in a cool, dry place until ready to mold into a neck collar by injection molding.

Injection Molding Procedure
1. Add the dry collar blend into the injection molding machine feed hopper.
2. Start the molding cycle, adjusting the processing and temperature conditions to produce a collar that meets established collar specifications. The temperature range of the barrel and the manifold of the machine should be between 260° F. to 375° F.
3. Store the molded collars in sealed containers until final packaging is complete.

Other examples of the inventive composition are Compositions 2-6 as follows:

| Material | Composition 2 | Composition 3 | Composition 4 | Composition 5 |
|---|---|---|---|---|
| PVC Resin | 56.4 | 42.13 | 46.13 | 48.13 |
| Dicapryl Adipate | 0.00 | 18.57 | 22.57 | 24.57 |
| Triphenyl Phosphate | 28.00 | 24.00 | 16.00 | 12.00 |
| Fipronil | 12.00 | 12.00 | 12.00 | 12.00 |
| Methoprene | 0.50 | 0.50 | 0.50 | 0.50 |
| Pyriproxyfen | 0.50 | 0.50 | 0.50 | 0.50 |
| Plastistab 2417 | 2.00 | 2.00 | 2.00 | 2.00 |
| Titanium Dioxide | 0.30 | 0.30 | 0.30 | 0.30 |

| Material | Composition 6 |
|---|---|
| PVC Resin | 40.38 |
| Dicapryl Adipate | 13.32 |
| Triphenyl Phosphate | 28.00 |
| Fipronil | 7.50 |
| Bifenthrin | 7.50 |
| Deltamethrin | 0.00 |

-continued

| Material | Composition 6 |
|---|---|
| Methoprene | 0.50 |
| Pyriproxyfen | 0.50 |
| Plastistab 2417 | 2.00 |
| Titanium Dioxide | 0.30 |

Surprisingly, it has been found that the level of triphenyl phosphate has a major effect on the release rate of the pesticides from the collar. It has been further found that the level of triphenyl phosphate (TPP) in combination with dicapryl adipate also has a major effect on the release rate of pesticides from the collar. This is illustrated by the results of a 12 week in vitro modeling study where collar test strips were measured for active ingredient release by mechanical action. Collar formulations kept the active ingredient composition constant at 12% while varying the amount of the triphenyl phosphate as well as varying the triphenyl phosphate (TPP):dicapryl adipate (DCA) weight ratio to explore the impact of the plasticizer compositions on active ingredient release. The strips were wiped with a KimWipe tissue paper once a week and both the strip and paper weighed; the chemical composition of the strip and tissue was also measured to confirm that the observed weight loss is derived from collar ingredient migration from the PVC matrix to the tissue. The measured weight loss was found to be the result of the amount of the plasticizer triphenyl phosphate as well as due to the combination of the plasticizers triphenyl phosphate and dicapryl adipate along with the active ingredient that was released by the substrate. Tested compositions are shown in the table above along with the graph of FIG. 1 showing the resulting weight loss over time.

| Formula | TPP:DCA | TPP:Active | Initial Release Rate (mg/g collar substrate) | Steady State Release Rate (mg/g collar substrate) |
|---|---|---|---|---|
| Example Composition 1 | 1.69 | 2.33 | 3.225 | 0.728 |
| Example Composition 3 | 1.29 | 2.00 | 2.406 | 0.654 |
| Example Composition 4 | 0.71 | 1.33 | 2.219 | 0.383 |
| Example Composition 5 | 0.49 | 1.00 | 1.862 | 0.335 |

The data demonstrates the dependence of active ingredient release on the TPP: active ingredient weight ratio with the favored weight ratio being in the range of between about 4.0:1 and 0.75:1, preferably between about 2.5:1 and 1.0:1, more preferably between about 2.0:1 and 1.25:1.

This data also demonstrates the dependence of active ingredient release on the TPP:DCA weight ratio, with the favored weight ratio being in the range of between about 2.25:1 and 0.25:1, preferably between about 1.75:1 and 0.45:1, more preferably between about 1.5:1 and 1:1.

Figure 2:
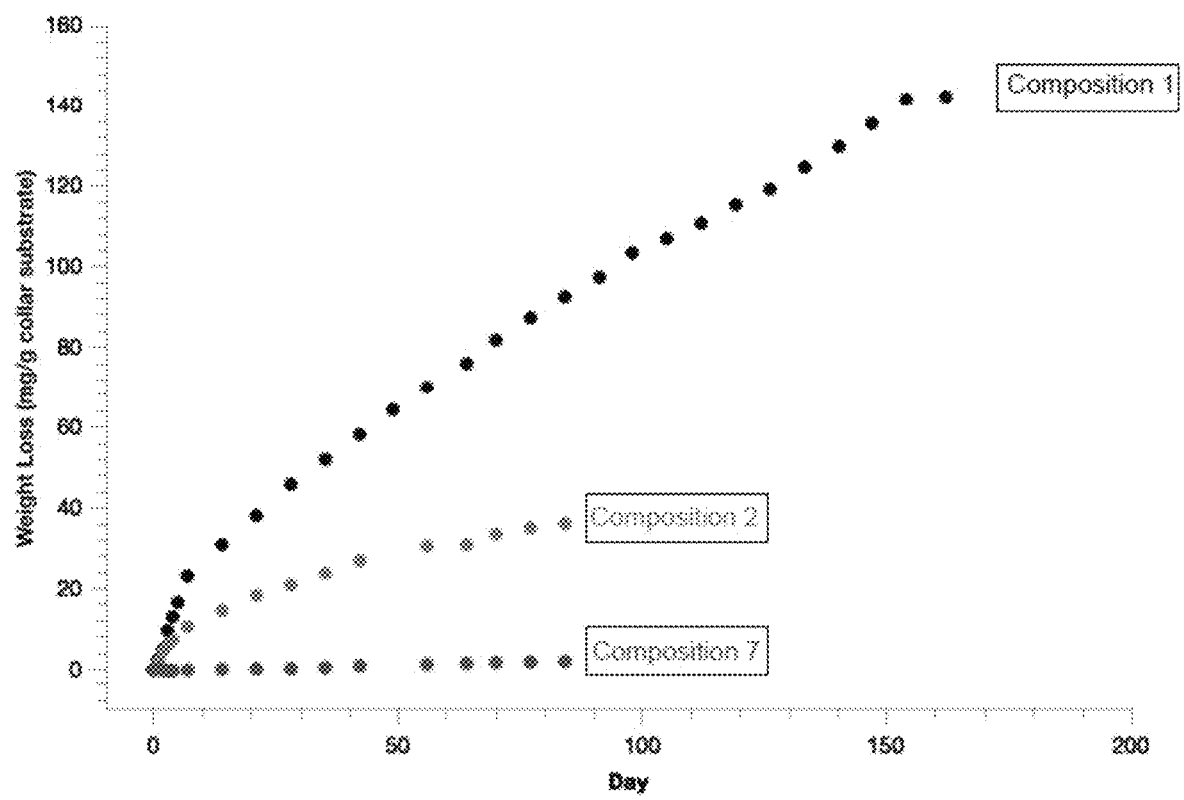
FIG. 2 is a second graph showing collar test strip weight loss resulting from the level of the plasticizers triphenyl phosphate and dicapryl adipate.

An example of a composition that does not practice the invention (since TPP is not included) is Composition 7 and the graph of FIG. 2 shows the resulting weight loss over time:

| Material | Composition 7 |
|---|---|
| PVC Resin | 54.4 |
| Dicapryl Adipate | 30.00 |
| Triphenyl Phosphate | 0.00 |
| Fipronil | 12.00 |
| Methoprene | 0.50 |
| Pyriproxyfen | 0.50 |
| Plastistab 2417 | 2.00 |
| Titanium Dioxide | 0.30 |

Based on the results of the study, it is anticipated that active ingredient release from a molded body made in accordance with the invention is substantially controlled by both the TPP:phenyl pyrazole ratio and the TPP:DCA ratio so that molded body will be effective in controlling ectoparasites that infest a companion animal for up to six months to even a year.

While there has been described what are at present considered to be the preferred embodiments of the present invention, it will be apparent to those skilled in the art that the embodiments described herein are by way of illustration and not of limitation. Various modifications of the disclosed embodiments, as well as alternative embodiments of the invention, will become apparent to persons skilled in the art upon reference to the description of the invention. Therefore, it is to be understood that various changes and modifications may be made in the embodiments disclosed herein without departing from the true spirit and scope of the present invention, as set forth in the appended claims, and it is contemplated that the appended claims will cover any such modifications or embodiments. The scope of the invention is set forth in the following claims.

The invention claimed is:

1. A solid molded body for external use against parasites on animals, the solid molded body made from a composition comprising fipronil as an active insecticide and triphenyl phosphate and dicapryl adipate as plasticizers, wherein the weight ratio of triphenyl phosphate to fipronil is between about 4.0:1 and 0.75:1 and the weight ratio of triphenyl phosphate to dicapryl adipate is between about 2.25:1 and 0.25:1.

2. The molded body of claim 1, the composition further comprising a mixture of one or more pyrethroids in an amount between about 1.0 and 25.0 weight percent.

3. The molded body of claim 1, wherein fipronil is present in the composition in an amount between about 1.0 and 25.0 weight percent.

4. The molded body of claim 2, wherein the one or more pyrethroids are selected from the group consisting of bifenthrin, permethrin, deltamethrin, zeta-cypermethrin, lambda cyhalothrin and beta-cyfluthin.

5. The molded body of claim 1, wherein fipronil is present in the composition in an amount between about 2.0 and 15.0 weight percent and the plasticizers triphenyl phosphate and dicapryl adipate are together present in the composition an amount between about 15.0 and 45.0 weight percent.

6. The molded body of claim 5, wherein fipronil is present in the composition in an amount between about 5.0 and 15.0 weight percent and the plasticizers are present in the composition in an amount between about 25.0 and 45.0 weight percent.

7. The molded body of claim 5, the composition further comprising at least one of pyriproxyfen in an amount between about 0.1 and 2.0 weight percent and methoprene in an amount between about 0.1 and 2.0 weight percent, with the weight percent total of pyriproxyfen and methoprene being no greater than 2.0 weight percent.

8. A method of dermally controlling parasites on an animal comprising contacting the animal with the molded body of claim 1.

9. The molded body of claim 2, wherein fipronil is present in the composition in an amount between about 2.0 and 15.0 weight percent and the pyrethroid is present in the composition in an amount between about 2.0 and 15.0 weight percent.

10. The molded body of claim 7, wherein fipronil is present in the composition in an amount between about 5.0 and 10.0 weight percent and the plasticizers are present in the composition in an amount between about 35.0 and 45.0 weight percent.

11. The molded body of claim 1, the composition further comprising pyriproxyfen in an amount between about 0.2 and 0.9 weight percent and methoprene in an amount between about 0.2 and 0.9 weight percent.

12. The molded body of claim 6, the composition further comprising pyriproxyfen in an amount between about 0.2 and 0.9 weight percent and methoprene in an amount between about 0.2 and 0.9 weight percent.

13. The molded body of claim 1, the composition further comprising a thermoplastic elastomer as a carrier substance.

14. The molded body of claim 13, wherein the thermoplastic elastomer is a polyvinyl resin.

15. The molded body of claim 14, wherein the polyvinyl resin is a polyvinyl halide selected from the group consisting of polyvinyl chloride, polyvinyl chloride-vinyl acetate and polyvinyl fluoride.

16. The molded body of claim 14, wherein the polyvinyl resin is present in the composition in an amount between about 30 and 60 weight percent.

17. The molded body of claim 5, wherein the composition includes triphenyl phosphate in an amount between about 20.0 and 35.0 weight percent and dicapryl adipate in an amount between about 12.0 and 25.0 weight percent.

18. The molded body of claim 12, wherein the composition includes triphenyl phosphate in an amount between about 20.0 and 35.0 weight percent and dicapryl adipate in an amount between about 12.0 and 25.0 weight percent.

19. The molded body of claim 1, wherein the body has a thickness of between about 0.25 and 4.5 mm.

20. The molded body of claim 1, wherein the weight ratio of triphenyl phosphate to fipronil is between about 2.5:1 and 1.0:1.

21. The molded body of claim 1, wherein the weight ratio of triphenyl phosphate to dicapryl adipate is between about 1.75:1 and 0.45:1.

22. The molded body of claim 21, wherein fipronil is present in the composition in an amount between about 2.0 and 15.0 weight percent and the plasticizers triphenyl phosphate and dicapryl adipate are together present in the composition an amount between about 15.0 and 45.0 weight percent.

23. The molded body of claim 22, the composition further comprising at least one of pyriproxyfen in an amount between about 0.1 and 2.0 weight percent and methoprene in an amount between about 0.1 and 2.0 weight percent, with the weight percent total of pyriproxyfen and methoprene being no greater than 2.0 weight percent.

24. The molded body of claim 19, the composition further comprising a mixture of one or more pyrethroids in an amount between about 1.0 and 25.0 weight percent.

25. The molded body of claim 22, wherein the composition includes triphenyl phosphate in an amount between about 20.0 and 35.0 weight percent and dicapryl adipate in an amount between about 12.0 and 25.0 weight percent.

26. The molded body of claim 1, wherein the weight ratio of triphenyl phosphate to fipronil is between about 2.5:1 and 1.0:1.

27. A method of dermally controlling parasites on an animal comprising contacting the animal with the molded body of claim 1.

28. The molded body of claim 1, the composition further comprising at least one of pyriproxyfen in an amount between about 0.1 and 2.0 weight percent and methoprene in an amount between about 0.1 and 2.0 weight percent, with the weight percent total of pyriproxyfen and methoprene being no greater than 2.0 weight percent.

\* \* \* \* \*